No. 763,321. PATENTED JUNE 21, 1904.
H. C. PORTER.
STORAGE BATTERY.
APPLICATION FILED NOV. 25, 1901.
NO MODEL. 2 SHEETS—SHEET 1.
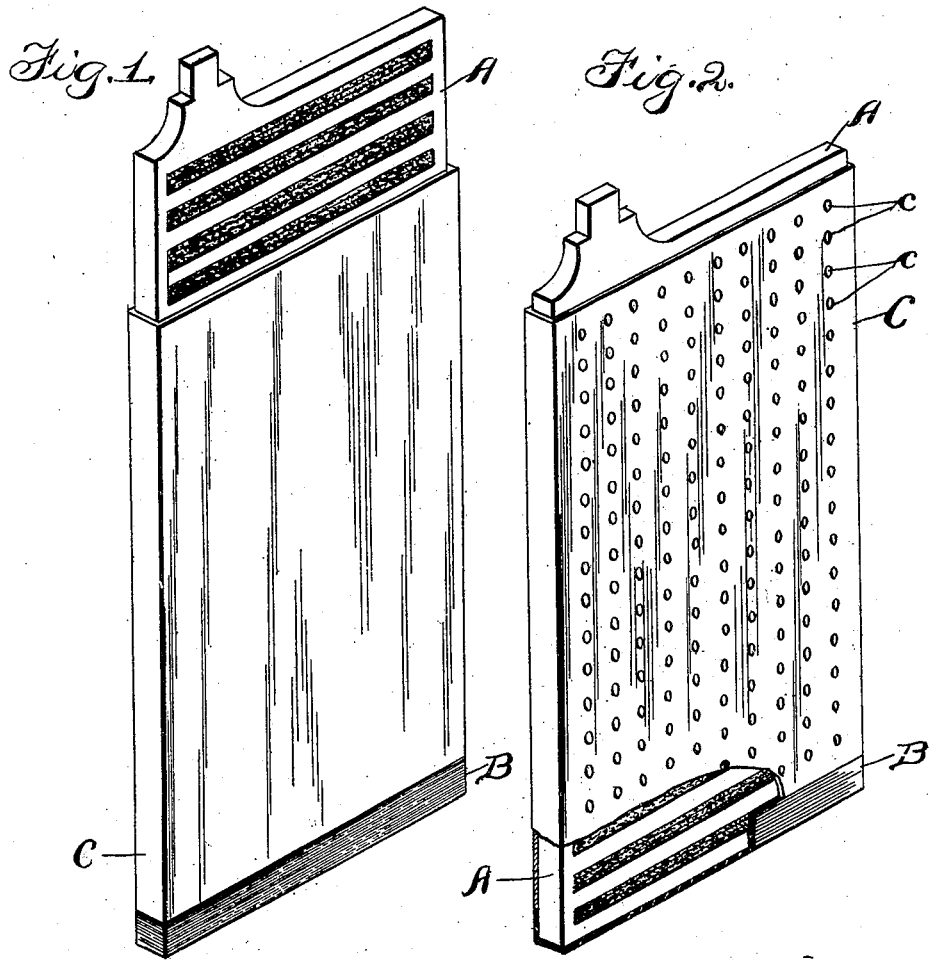
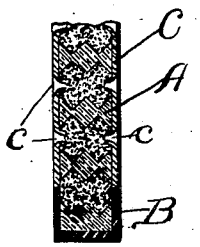
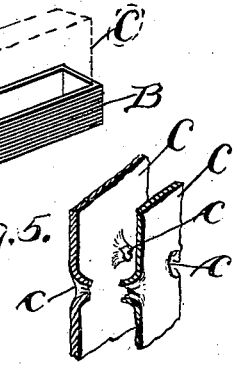
Witnesses:
J. B. Weir
J. Perry
Inventor
Henry C. Porter
By Raymond & Barnett
Attys No. 763,321. PATENTED JUNE 21, 1904.
H. C. PORTER.
STORAGE BATTERY.
APPLICATION FILED NOV. 25, 1901.
NO MODEL. 2 SHEETS—SHEET 2.
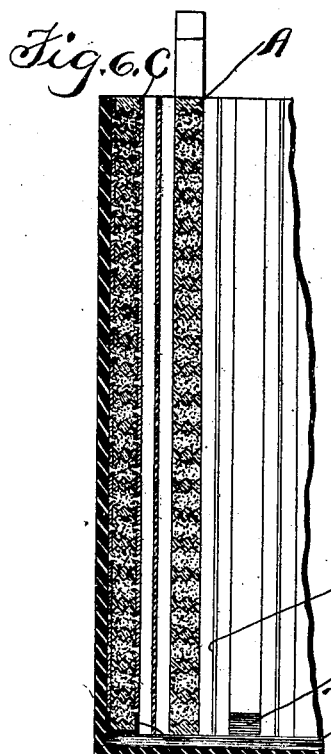
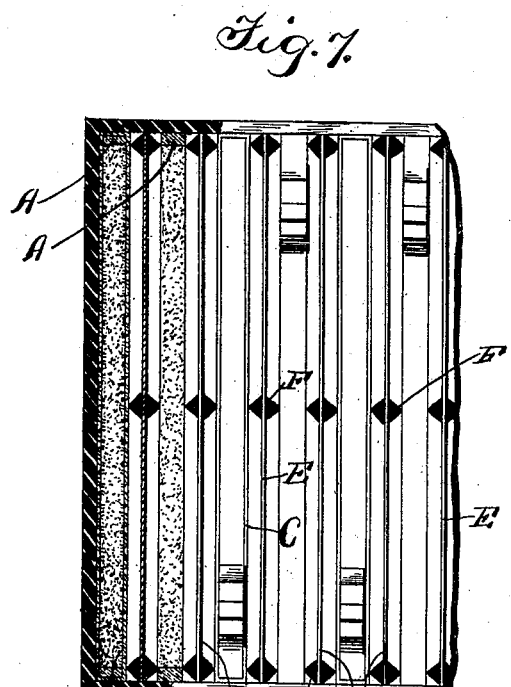
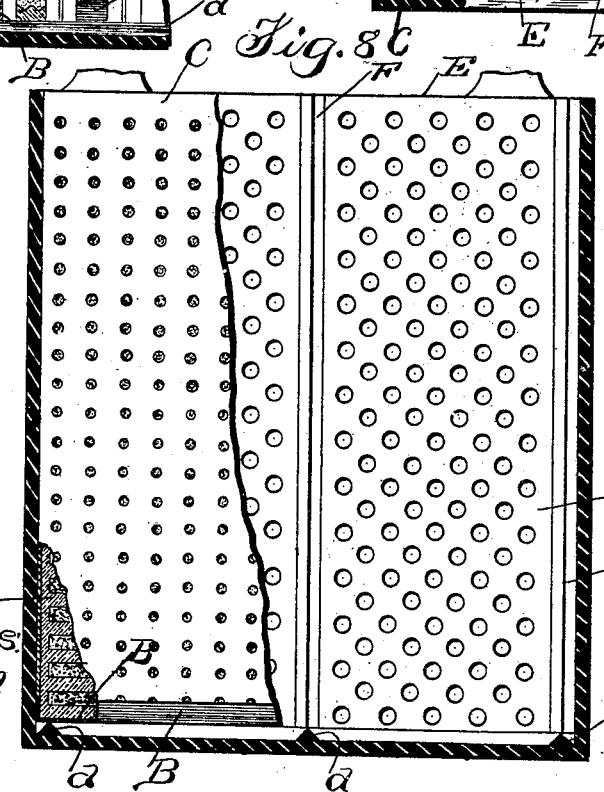

No. 763,321.

Patented June 21, 1904.

UNITED STATES PATENT OFFICE.

HENRY C. PORTER, OF WAUKEGAN, ILLINOIS, ASSIGNOR TO PORTER BATTERY COMPANY, OF CHICAGO, ILLINOIS, A CORPORATION OF ILLINOIS.

STORAGE BATTERY.

SPECIFICATION forming part of Letters Patent No. 763,321, dated June 21, 1904.

Application filed November 25, 1901. Serial No. 83,601. (No model.)

*To all whom it may concern:*

Be it known that I, HENRY C. PORTER, a citizen of the United States, and resident of the city of Waukegan, in the county of Lake and State of Illinois, have invented new and useful Improvements in Storage Batteries, of which the following is a full, clear, and exact description, reference being had to the accompanying drawings, forming a part hereof.

The primary object of my invention is to provide a storage-battery plate which shall be efficient, durable, compact, and reliable.

The further object of my invention is to provide an effective and durable storage or secondary battery in which the positive and negative plates shall be effectively insulated from each other, so as to prevent the "local action" which is commonly caused in batteries of this character. This local action is due to a precipitate which forms at the bottom of the battery-cell after the battery has been in use for some time, which precipitate acts as a conductor sufficiently to connect the positive and negative plates, so as to set up this local action, which although slight is constant and materially affects the efficiency and life of the battery. It is the common practice to attempt to insulate the plates from each other by the use of insulating-blocks at the bottom of the battery-cell, upon which blocks the battery-plates rest; but it has been found that this precipitate being of an adhesive slimy nature forms upon these blocks, as well as upon the bottom of the cell, and ultimately reaches the bottom of the plates, whereupon said local action is set up. Under the influence of electrolytic action when the battery is in use the positive plates or grids tend to expand and contract and there is a tendency of the active material contained within the positive plates or grids to soften. This expansion and contraction of the grids and softening or disintegrating of the active material all tends to lessen the contact between the active material and the battery-plate and also tends to cause more or less of the active material to work loose from and drop out of the plate, all of which lessens the efficiency and life of the positive plates, and consequently of the battery.

Among the further objects of my invention, therefore, is the provision of novel means for maintaining a more constant contact between the active material and the metallic portions of the positive plate and for lessening the injurious effects upon the life and efficiency of the plate of its contraction and expansion.

These and such other objects as may hereinafter appear are attained by the devices shown in the accompanying drawings, in which—

Figure 1 is a perspective view of one of my improved battery-plates in the process of formation, with the battery-grid partially inclosed in its metallic envelop. Fig. 2 is a like view of my improved battery-plate completely assembled. Fig. 3 is a detail in perspective of a battery-plate protector or shoe. Fig. 4 is a transverse sectional detail through one of my completely-assembled plates. Fig. 5 is a perspective view in detail of a portion of the opposing walls of my improved battery-plate cover or sheath, showing the perforations therethrough. Fig. 6 is a detail showing a transverse section through a portion of one of my improved battery-cells. Fig. 7 is a horizontal section of one of my improved battery-cells. Fig. 8 is an end elevation of one of my improved cells, showing the end wall of the cell removed, a part of the view showing part of the sheath broken away and another part of the view showing a portion of a sheathed battery-plate broken away, so as to disclose the separator.

Like letters of reference indicate the same parts in the several figures of the drawings.

A is a battery-grid of any suitable form, but preferably provided with ribs having a W-shaped groove in cross-section, as shown in Fig. 4.

B is a protector formed in the shape of a shoe or trough of any suitable material not subject to corrosion by any of the chemicals within the battery-cell or by any of the compounds produced thereby. I prefer to use hard rubber for this purpose.

C is a metallic envelop or sheath adapted to snugly receive one of the battery-grids, as shown in Fig. 1. This envelop C should preferably be made of lead or of some suitable lead non-oxidizable alloy. This envelop or sheath constitutes a rigid support extending across both faces of the grid carrying the active material, and, being formed of lead or of a non-oxidizable alloy of lead, it is not affected or transformed by the forming process, under which the active material is converted into an oxid of lead. It also offers a large surface for contact with the electrolyte, and, being perforated so as to form tangs on its inner face, which are embedded within the active material, it serves to more effectively connect the electrodes with the active material and to hold the active material in position against displacement by its expansion and contraction under the influence of electrolytic action.

The shoe B, as shown in Fig. 2, is preferably of a size to snugly fit over the lower end of the battery-grid, while the lower edge of the envelop or sheath C rests upon the upper edge of the shoe or trough B.

While the envelop C may be fitted to all of the battery-plates, I prefer to use it only on the positive-pole plates, as these plates, because of the nature of the electrolytic action therein and because of their expansion and contraction, are particularly subject to disintegration and to the loss of active material and to loss of contact with the active material.

I make my improved battery-plate by first pasting the grid A full of active material in the usual manner. I then inclose the grid A within the envelop C and place the inclosed grid and its envelop under a suitable press, by means of which I punch perforations c through the sides of the envelop C in such a manner that the metal of the envelop C displaced by the punching of these perforations is forced into the active material which has previously been pasted in the grid A. While I do not herein claim the described process for the manufacture of my improved battery-plate, I reserve the right to cover the same in a separate application. In this manner the envelop C is brought into intimate contact with the grid A and with the active material within the grid A. I "season" and then "form" the plate in the usual manner by subjecting it to an electric current, with the result that the active material is chemically transformed and hardened around and in close contact with the projections and jagged portions of the inner sides of the envelop C, resulting from the punching of the perforations c.

In making up a battery-cell, as shown in Fig. 6, I fill the cell D with alternately-arranged positive-pole plates inclosed within the envelop C and trough B and negative-pole plates resting within troughs B, but without envelops C, the faces of the positive and negative plates being insulated from each other by any suitable means. Preferably I employ a separator such as shown in Figs. 7 and 8, which is composed of a perforated sheet E, of insulating material, provided on its opposite sides with ribs F, also formed of insulating material, as this separator permits of a free circulation of the liquid electrolyte between the plates, provides vertical channels for the escape of gases, &c., has no ledges to catch and retain dislodged active material, is very light, and quite inexpensive.

While sheet D used alone will be quite as effective as the insulating-blocks commonly used, I prefer to have the shoe D rest upon such insulating-blocks d, thereby more efficiently preventing the connection of the plates with each other by means of the previously-noted precipitate.

It will be seen that the envelop C not only serves to effectively prevent the loosening and displacement of the active material from the plate, but by reason of the engagement between the prongs or projections upon the inner faces of the plate C and the active material which has been hardened around such prongs or projections a more constant contact between the active material and the metal of my composite plate is attained, while these projections or prongs also afford additional points of support for the active material, which tend to hold such active material in constant contact with the grid.

While I have referred to the covering shown and described by me for inclosing the grid as an "envelop" or "sheath," the broad idea of my invention is in inclosing the faces of the grid between perforated metallic plates. It is not essential to the broad idea of my invention that these plates shall be so associated with relation to each other as to technically constitute a sheath or envelop, nor that they shall be provided with projections extending into the active material contained within the grid, for my invention will be found to be operative if it is only utilized by inclosing the battery-grid containing active material between perforate or open-work plates of any suitable metal, such as lead or lead alloy; but I find that the best results are attained and my invention is most readily applied if the plates are associated, so as to form a sheath open at both ends, which can be slipped over the grid, so as to snugly fit the same and which may be then brought into intimate association with the grid and active material by perforating the plates in a press, so as to force projections therefrom into the active material, about which projections the active material is subsequently hardened when the plate is "formed" under the action of an electric current, thereby producing a plate in which the grid, active material, and sheath are so closely associated and secured to each other as to constitute a single unit in convenient form. It is evident, therefore, that there may be departures in details of construction without avoiding the spirit of my invention.

Having thus described my invention, what I claim, and desire to secure by Letters Patent, is—

1. A battery-plate comprising a grid provided at one end with a shoe of non-corrosive material, and inclosed within a metallic sheath, substantially as described.

2. A battery-plate comprising a grid filled with active material, inclosed within a metallic sheath and provided at its lower end with a shoe of non-conducting material, substantially as described.

3. A battery-plate comprising a grid provided with corrugated ribs, a metallic sheath inclosing the said grid, and a shoe of non-conducting material on the lower end of the said grid.

4. A battery-plate comprising a grid, a shoe on end of the said grid, and a sheath inclosing the said grid and supported on the said shoe.

5. A battery-plate comprising a grid, a sheath having open ends and perforated side walls inclosing the said grid, and a shoe, said shoe receiving the lower end of the said grid and supporting the said sheath.

6. A battery-plate comprising a grid provided with a series of transversely-arranged openings forming ribs therebetween, said ribs having corrugated faces, and containing active material inclosing the lower end of the said grid, and plates provided with projections upon their inner faces which extend into said active material.

HENRY C. PORTER.

Witnesses:
O. R. BARNETT,
M. E. SHIELDS.